(12) United States Patent
Hansen et al.

(10) Patent No.: US 7,082,460 B2
(45) Date of Patent: Jul. 25, 2006

(54) CONFIGURING A NETWORK GATEWAY

(75) Inventors: James R. Hansen, Franklin, MA (US); Tom Nelson, Northboro, MA (US); Charlie Trageser, Auburndale, MA (US); Brian Dodge, Norfolk, MA (US); Dale E. Calder, Mansfield, MA (US)

(73) Assignee: Axeda Corporation, Foxboro, MA (US)

( * ) Notice: Subject to any disclaimer, the term of this patent is extended or adjusted under 35 U.S.C. 154(b) by 645 days.

(21) Appl. No.: 10/126,057

(22) Filed: Apr. 19, 2002

(65) Prior Publication Data
US 2003/0200285 A1    Oct. 23, 2003

(51) Int. Cl.
G06F 15/177    (2006.01)

(52) U.S. Cl. .................... 709/220; 709/203

(58) Field of Classification Search ........ 701/201–203, 701/220–224
See application file for complete search history.

(56) References Cited

U.S. PATENT DOCUMENTS

| | | | |
|---|---|---|---|
| 6,286,038 B1 * | 9/2001 | Reichmeyer et al. ....... | 709/220 |
| 6,493,871 B1 * | 12/2002 | Welch et al. ............... | 717/173 |
| 6,570,867 B1 * | 5/2003 | Robinson et al. .......... | 370/351 |
| 6,980,558 B1 * | 12/2005 | Aramoto .................... | 370/401 |
| 2001/0002914 A1 * | 6/2001 | Aramoto .................... | 370/535 |
| 2002/0069276 A1 * | 6/2002 | Hino et al. ................. | 709/223 |
| 2002/0083342 A1 * | 6/2002 | Webb et al. ................ | 713/201 |
| 2002/0116550 A1 * | 8/2002 | Hansen ....................... | 709/330 |
| 2003/0121032 A1 * | 6/2003 | Cho et al. ................... | 717/173 |
| 2003/0145053 A1 * | 7/2003 | Bodin et al. ................ | 709/205 |
| 2004/0215755 A1 * | 10/2004 | O'Neill ...................... | 709/223 |

FOREIGN PATENT DOCUMENTS

| | | |
|---|---|---|
| EP | 0745929 | 12/1996 |
| EP | 1091522 | 4/2001 |
| WO | WO 0126336 | 4/2001 |
| WO | WO 0197019 | 12/2001 |

OTHER PUBLICATIONS

Evolution of the World Wide Web and the Internet, Vincent Bouthors, Sep. 1996.*
Simple Object Access Protocol (SOAP) 1.1, W3C, May 8, 2000.*
Open Services Gateway Initiative (OSGi), Specification Overview, Version 1.0, Jan., 2000, 13 pages.

* cited by examiner

*Primary Examiner*—Glenton B. Burgess
*Assistant Examiner*—Philip S. Scuderi
(74) *Attorney, Agent, or Firm*—Fish & Richardson P.C.

(57) ABSTRACT

A system includes a device, a gateway that is in communication with the device, and a server that is in communication with the gateway. The gateway includes circuitry to obtain data relating to the device, to transmit the data to a server, and to receive configuration information from the server that is generated based on the data. The server includes circuitry to receive the data from the gateway, to generate the configuration information based on the data, and to transmit the configuration information to the gateway.

49 Claims, 2 Drawing Sheets

CONFIGURING A NETWORK GATEWAY

TECHNICAL FIELD

This invention relates generally to configuring a network gateway and, more particularly, to a system that obtains the identity of devices connected to the gateway and generates configuration information for the gateway based on the identity of the devices.

BACKGROUND

An apparatus may contain an embedded controller or agent software to monitor and control its operation. Any type of apparatus may have an embedded controller or agent including, but not limited to, home appliances, office equipment, medical devices, and industrial tools. Other examples include robots, blood analyzers, multifunction copiers, and air conditioners.

Embedded controllers, also referred to as "embedded devices", are often connected to an internal network, such as a local area network (LAN), wireless IEEE (Institute of Electrical & Electronics Engineers) 802.11, or HomePlug powerline, with an interface to the Internet. One type of interface to the Internet is a network gateway (or simply "gateway").

A gateway is a software system (which may be installed on a stand-alone device) for interfacing devices near the gateway to remote, centralized services. A gateway acts as the interface between proximity local area protocols and wide area protocols, such as TCP/IP (Transmission Control Protocol/Internet Protocol) on the Internet. A gateway also manages its client devices, aggregates their data, and performs other related tasks.

Ideally, a gateway should not require manual configuration. In practice, however, a gateway is general purpose and may encounter many different kinds of devices. Similarly, devices on the local network may change configurations. This flexibility means that a gateway cannot be pre-configured to handle all possible devices. The management of gateways and their devices becomes the responsibility of a central server.

SUMMARY

In general, in one aspect, the invention is directed to a gateway that is in communication with a device. The gateway obtains data relating to the device, transmits the data to a server, and receives configuration information from the server. The configuration information includes customized information relating to the device that is generated based on the data. This aspect of the invention may also include one or more of the following features.

The data may be identification information for the device. The identification information may identify at least one of a type of the device, an instance of the device, a version of the device, and a manufacturer of the device. The data may be obtained by communicating with the device using a discovery protocol and/or by reading a file. The file may reside on the gateway. The data may be transmitted to the server as an extensible Markup Language document using HyperText Transfer Protocol.

The gateway may format the data as a self-describing computer language document prior to transmission. The gateway may configure/reconfigure itself based on the configuration information. The gateway may transmit at least some of the configuration information to the device.

The configuration information may be generated dynamically based on the data. The configuration information may include at least one of (i) instructions to process, collect and/or publish information received from the device, (ii) instructions to generate a graphical user interface to display information relating to the device; (iii) instructions defining a language for presenting information relating to the device, and (iv) a list of files to download. The gateway may download at least one of the files from the list.

The gateway may be in communication with plural devices. In this case, the gateway may obtain data relating to each of the plural devices, transmit the data to a server, and receive configuration information from the server. The configuration information may be customized information relating to each of the plural devices that is generated based on the data.

The gateway may determine if communication with the device has been lost and, in this case, it may report a loss of communication to the server. The gateway may determine if predetermined configuration information can be obtained from the device and, in this case, it may receive the predetermined configuration information from the device. The obtaining, transmitting and receiving processes noted above may be performed if the predetermined configuration information cannot be received from the device. The gateway may configure itself, using the configuration information, to monitor the device, aggregate data from plural monitored devices, and report the aggregated data to the server.

In general, in another aspect, the invention is an apparatus, such as a server, that is in communication with the gateway. The apparatus receives data from the gateway; generates configuration information relating to the device based on the data, and transmits the configuration information to the gateway. This aspect of the invention may also include one or more of the following features.

The data may include at least one of identification information for the device and identification information for the gateway. The identification information may identify at least one of a type of the device, an instance of the device, a version of the device, and a manufacturer of the device. The configuration information may be generated dynamically by selecting from a plurality of configurations based on the data. The configuration information may be an amalgamation of data retrieved from one or more sources by the apparatus. The configuration information may include at least one of (i) instructions to process, collect and/or publish information received from the device, (ii) instructions to generate a graphical user interface to display information relating to the device; (iii) instructions defining a language for presenting information relating to the device, and (iv) a list of files to download. The configuration information may be generated by retrieving data from one or more sources and inserting the data into a predefined template.

The apparatus may generate a graphical user interface to enable selection of the device when configuring the gateway. The configuration information may be transmitted to the gateway as an extensible Markup Language document using HyperText Transfer Protocol. The configuration information may include a list of files to download. The apparatus may download at least one of the files from the list to the gateway.

The data received by the apparatus may include identification information that identifies the device. The apparatus may generate the configuration information by obtaining the configuration information based on a hierarchy of the identification information. Searching according to the hierarchy may include searching first for configuration information relating to an instance of the device and then based on more general information relating to the device than the instance until appropriate configuration information is obtained.

The apparatus may obtain capabilities of the device from a database and generate the configuration information based on the capabilities of the device. The apparatus may download the capabilities from a server that maintains a database of device capabilities. The device capabilities may be defined by one or more SNMP MIBs (Simple Network Management Protocol Management Information Bytes). The capabilities of the device may be obtained based on the identification information received from the gateway. The identification information may include at least one of a type of the device and a version of the device.

In general, in another aspect, the invention is directed to an apparatus, such as a server, that receives identification information for a device, searches a database of SNMP MIBs based on the identification information to obtain SNMP MIBs that correspond to the device, the SNMP MIBs defining one or more capabilities of the device, and outputs SNMP MIBs that correspond to the device. This aspect of the invention may include one or more of the following features.

The apparatus may search the database based on a hierarchy of the identification information. Searching based on the hierarchy may include searching first for SNMP MIBs relating to an instance of the device and then searching for SNMP MIBs based on more general information relating to the device than the instance until appropriate SNMP MIBs are found.

In general, in another aspect, the invention is directed to a system that includes a device, a gateway that is in communication with the device, and a server that is in communication with the gateway. The gateway includes circuitry to obtain data relating to the device, to transmit the data to a server, and to receive configuration information from the server that is generated based on the data. The server includes circuitry to receive the data from the gateway, to generate the configuration information based on the data, and to transmit the configuration information to the gateway. This aspect of the invention may also include one or more of the following features.

The system may include an apparatus having circuitry to receive identification information for the device from the server, search a database of SNMP MIBs based on the identification information to obtain SNMP MIBs that correspond to the device, the SNMP MIBs defining one or more capabilities of the device, and output, to the server, SNMP MIBs that correspond to the device. The circuitry for each of the foregoing may be at least one of programmable logic, logic gates, a processor, and a memory.

Other features and advantages of the invention will become apparent from the following description, including the claims and drawings.

DESCRIPTION

Figure 1:
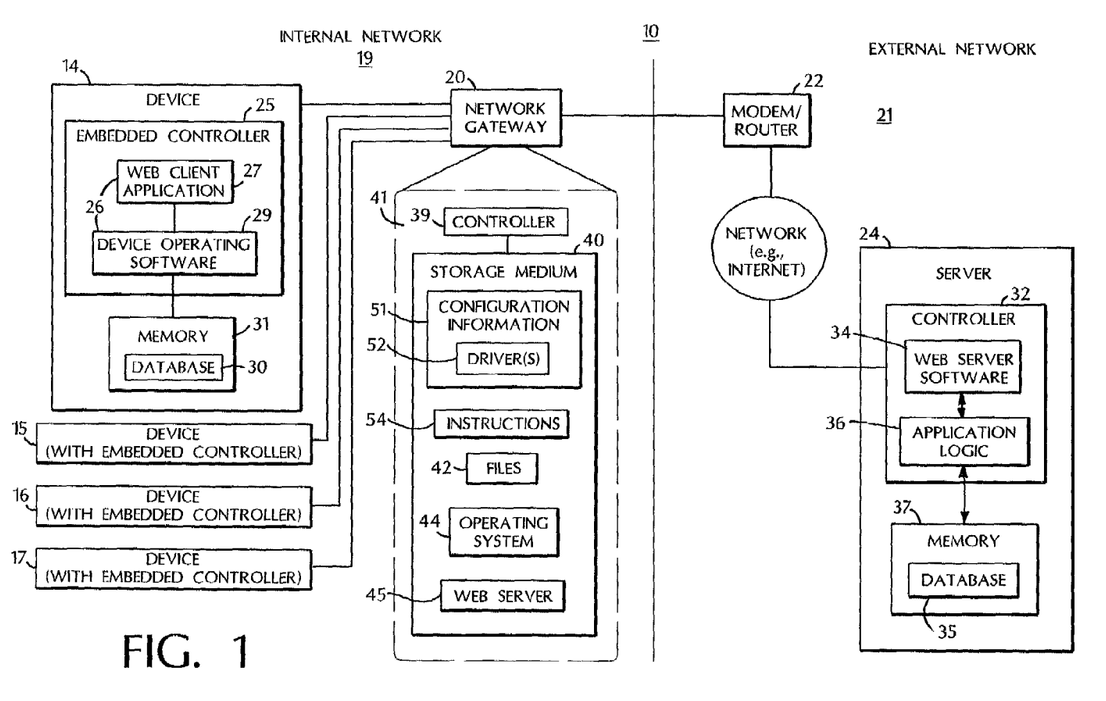
FIG. 1 is a block diagram of a network containing a server, a gateway, and various managed devices.

FIG. 1 shows a network 10. Network 10 includes multiple devices 14 to 17, each having an embedded controller. Devices 14 to 17 may be any type of apparatus or system having functions that can be monitored and controlled by an embedded controller. Device 14 is shown in detail for the sake of illustration. The remaining devices may have a similar configuration to device 14.

Devices 14 to 17 are connected to an internal network 19, which may be a wired or wireless network, serial data line, or power line(s) (e.g., such as a home network configured using AC (Alternating Current) power lines as communications media). A gateway 20 provides an interface between each of devices 14 to 17 on internal network 19 and an external network 21.

Gateway 20 communicates with each device 14 to 17 via internal network 19 using one or more protocols, such as SNMP (Simple Network Management Protocol), Modbus, HomePlug, UP&P (Universal Plug and Play), or one or more of many proprietary protocols. Gateway 20 manages devices 14 to 17, aggregates their data, and performs other tasks relating to the devices. A process for configuring gateway 20, and one or more of devices 14 to 17 through gateway 20, is described below with respect to FIG. 2.

A router or modem 22 couples internal network 19 to external network 21, such as the Internet/World Wide Web (Web). External network 21 runs TCP/IP or some other suitable protocol. Network connections throughout internal network 19 and external network 21 may be via Ethernet, telephone line, wireless, or other transmission media.

External network 21 contains a server 24, which may be a computer or any other processing device.

Embedded Controller

Embedded controller 25 runs software 26, which includes web client application 27 and device operating software 29. Web client application 27 includes a TCP/IP protocol stack that allows embedded controller 25 to communicate over external network 21. Device operating software 29 provides an interface between Web client application 27 and a database 30. Through device operating software 29, embedded controller 25 retrieves data stored in database 30 and stores data in database 30.

Database 30 is stored in a memory 31 on device 14 or internal to embedded controller 25. Database 30 stores configuration information for device 14, including, but not limited to, operational parameters and configuration files, and identification information for the device.

The operational parameters constitute settings and/or control instructions for device 14, which are implemented by embedded controller 25. The types of operational parameters that are stored in database 30 depend on the nature of device 14. For example, if device 14 is a heating/cooling system, the operational parameters may include temperature levels, humidity levels, airflow controls, vent/duct open/close controls, and fan motor speed settings. A configuration file may contain one or more such operational parameters (and other information) for an instance of device 14.

What is meant by "instance" is the specific identity of device 14 as distinguished from other identical devices. The identification information stored in database 30 may identify the instance of device 14. This identification information may include, but is not limited to, data identifying the type of the device, the version of the device (e.g., an updated model), the manufacturer of the device, the model name of the device, the model number of the device, the serial number of the device, and a universal unique identifier (UUID) for the device.

Although embedded controller 25 is described herein as providing device 14 with significant "intelligence", it is noted that the processes described herein work equally with less "intelligent" devices. For example, device 14 may be a relatively "simple" system that is capable of providing status information to gateway 20, but not of accepting commands from a remote device, such as gateway 20. For example, a simple photocopier may be able to provide its copy count to gateway 20, but little else. Likewise, device 14 may also be capable of two-way communication, but not to a great extent. For example, a home thermostat may be capable of providing a temperature reading to gateway 20 and of receiving a new temperature setting from gateway 20.

Server

Server 24 is a computer that runs HTTP. Server 24 includes a controller 32, such as a microprocessor or other processing device, for executing instructions to perform the functions described below. To avoid confusion in terminology, the following reads as though those functions are performed by server 24, even though software in controller 32 of server 24 performs the functions.

Server 24 executes Web server software 29 to communicate over external network 21. Web server software 34 also may host a Web page for device 14. The Web page (not shown) may be displayed on the computer of a user who may select a device and input configuration information to configure the gateway to manage the device. This configuration information is transmitted to Web server software 34 over external network 21. Web server software 34 stores the configuration information in database 35. Database 35 is stored in a memory 37, which is inside of, or external to, server 24. Database 35 may also store variables that are monitored during the operation of device 14. Configuration parameters for a device can be stored in database 35 individually or as part of a configuration file for an instance of a device.

Web server software 34 stores and retrieves data in database 35 using application logic 36. Application logic 36 is software for accessing database 35 using, for example, Java servlets and a JDBC (Java Data Base Connectivity) database Network Gateway Gateway 20 is a computer that runs SNMP or any other supported protocol to communicate with devices 14 to 17 on internal network 19 and HTTP to communicate with server 24 on external network 21. Gateway 20 includes a controller 39, such as a microprocessor, and a storage medium 40, which stores executable instructions 54 to perform the configuration (and other) functions described below (see internal architecture view 41).

Storage medium 40 may also include one or more files that include information identifying devices 14 to 17 on internal network 19, which are managed by gateway 20. The information in the file(s) may include identification information, such as a type of the device, a version of the device, an instance of the device, and a manufacturer of the device. Other types of identification information, such as that noted above, may also be included in the file(s) in storage medium 40.

Gateway 20 runs an operating system 44, such as WindowsNT® or Linux, and a Web sever application 45, which enable gateway 20 to host one or more Web pages. The Web pages (not shown) may be for each of devices 14 to 17. Web pages hosted by the gateway may be in lieu of, or in addition to, any Web pages hosted by server 24. The Web pages may be used to monitor and control the devices managed by the gateway. In addition, gateway 20 (or server 24) may host a Web page for the gateway itself. This Web page may be used to reconfigure the gateway manually. For example, software may be downloaded to the gateway to handle different types of devices.

Figure 2:
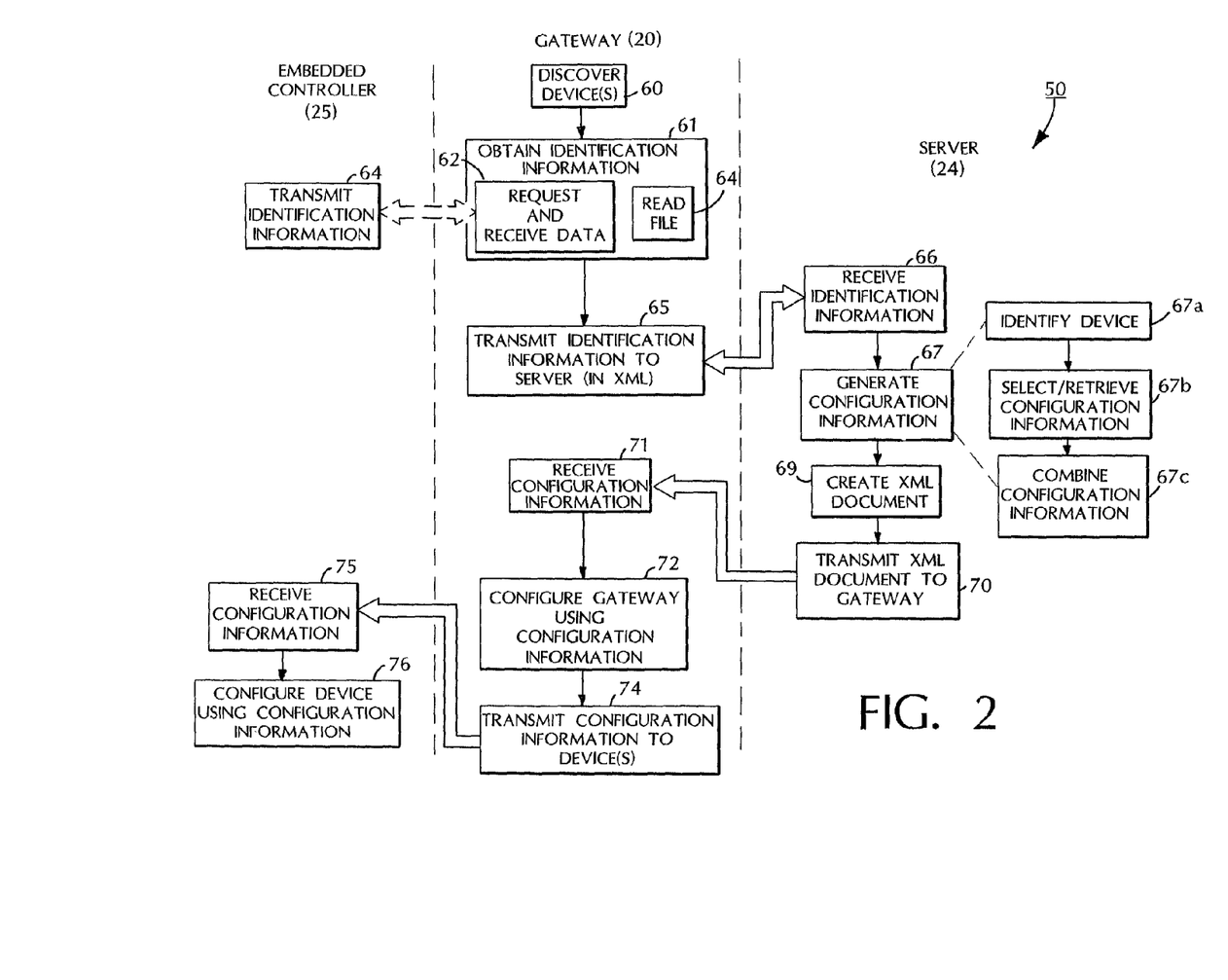
FIG. 2 is a flowchart showing a process for configuring the gateway and/or the devices of FIG. 1.

Alternatively, and in accordance with this embodiment, gateway 20 may reconfigure itself, and one or more of devices 14 to 17, automatically (i.e., without user intervention). FIG. 2 shows a process 50 for configuring gateway 20 (and devices 14 to 17).

Configuration information 51 for gateway 20 specifies data variables to collect from its managed devices, expressions, alarm conditions, data to log, notifications such as electronic mail or pager numbers to alert people to a condition, and processes for reporting such information to a centralized server 24. In this embodiment, the configuration information may include one or more computer files with instructions on how to monitor a device and calculate alarm conditions based on data received from the device. For example, an expression may be "Tank1+Tank2", which adds device variables called Tank1 and Tank2 to find a total tank level in a device. An alarm may be defined as a condition such as "Tank1>280", the occurrence of which may require gateway 20 to notify server 24.

Configuration information for gateway 20 may define data variables within the gateway. These definitions include the device driver(s) 52 for the gateway to use to communicate with the device, the data type associated with the variables, and the sampling rate associated with a device. A device driver 52 is a software program residing in gateway 20 for managing an associated device. A device driver in gateway 20 obtains device variables and acquires data for each such variable. Drivers usually acquire data by sending a request over a network and receiving a reply. Drivers may also receive asynchronous messages or read hardware registers in the devices directly.

Gateway 20 includes a software engine for processing information acquired from devices 14 to 17 in the manner described above. For example, the engine can determine expressions and alarm conditions, and communicate information to a centralized server in a variety of ways. There may be a separate driver/engine for each customer (manufacturer) or device managed by the gateway. The configuration of each such driver/engine may be different for each customer and/or type of device.

Configuration Process

FIG. 2 shows a process 50 for configuring gateway 20 to interact with devices on the internal network. A brief summary and example describing process 50 is as follows.

Gateway 20 may include an SNMP driver. When gateway 20 starts, the SNMP driver finds four devices connected to the gateway: a copier, a printer, a UPS (Uninteruptible Power Supply), and a network router 22. Gateway 20 sends data identifying these four devices to server 24. This data may include the manufacturer, model number, and individual serial numbers of the four devices.

Server 24 responds to the data with a list of configuration files for network gateway 20 to obtain. The configuration files relate to the devices discovered using the SNMP driver. Gateway 20 downloads each of the files in the list from the server or some other source that is accessible to gateway 20, thereby configuring gateway 20.

The resulting configuration causes the gateway to perform the following functions for the devices. For the copier, the configuration causes gateway 20 to read its copy count and status and to report the copy count each day to a third party, such as the copier manufacturer or service center. If the status indicates a fault for more than one hour, the gateway is to report this alarm condition to the third party. For the printer, the configuration causes gateway 20 to read its paper usage and toner level and to report this information to a third party, which may or may not be the same as the third party associated with the copier. For the UPS, the configuration causes gateway 20 to read the battery health and discharge cycles and to report this information to a third party, which may or may not be the same as the foregoing third parties. For the router, the configuration causes gateway 20 to ignore the router, since the router is not supported.

Thus, in above example, gateway 20 has three device configurations loaded. Each configuration may be independent of the others. Each configuration may contain one or more rules/instructions for gathering, processing, publishing and/or reporting data related to a device. For example, Web server 45 running on gateway 20 may provide three Web pages that publish the data for each device in its own format. One Web page may look like the LCD (liquid crystal display) on the copier, another Web page may provide statistics and history for the UPS, and so on.

FIG. 2 is broken-down into three portions based on the functions performed by the various devices. For example, the embedded controller 25 in device 14 performs the functions set forth in the portion labeled "Embedded Controller"; gateway 20 performs the functions set forth in the portion labeled "Gateway"; and server 24 performs the functions set forth in portion labeled "Server". The breakdown shown in FIG. 2 is but one way of implementing the processes described herein. The invention, however, is not limited as such.

Controller 32 in gateway 20 executes software (instructions 54) to perform its portion of process 50, as do server 24 and embedded controller 25. Gateway 20 discovers (60) devices that gateway 20 is managing on internal network 19. SNMP may be used to perform the device discovery; however, any suitable protocol may be used. Gateway 20 obtains (61) data relating to one or more of devices 14 to 17 on internal network 19. The data includes at least some of the identification information noted above, such as a type of a device, an instance of the device, and/or a manufacturer of the device.

The identification information for a device may be obtained by communicating with the device through a discovery protocol. For example, gateway 20 may issue (62) a request for the identification information. The embedded controller 25 may receive the request and transmit (64) the requested information to the gateway. Alternatively, gateway 20 may read (64) one of its (or other's) files in order to determine the identification information for devices on internal network 19. As another alternative, gateway 20 may read registers on the devices themselves.

In addition to identification information, gateway 20 may determine, using the discovery protocol, if pre-existing communication with a device has been lost. If so, gateway 20 may report this loss to server 24. Server 24 is thus able to determine if any devices are "missing". Gateway 20 may also determine if predetermined configuration information (e.g., rules on what parameters to monitor) is stored on the device. If so, gateway 20 may obtain the configuration information directly from the device, without going through server 24 as described below, unless that configuration information needs to be changed, updated or checked. The following, however, assumes that the configuration information is obtained from server 24.

Gateway 20 transmits (65) the identification information for a device 14 to server 24. The device may be a newly-discovered device or gateway 20 may simply query for new configuration information periodically. Gateway 20 generates an extensible Markup Language (XML) document that contains the identification information. XML is a self-describing computer language in the sense that fields in the XML code identify variables and their values in the XML code. The data may be formatted as an XML document using an XML template. Gateway 20 transmits the resulting XML document to server 24 using an HTTP POST command. The reply to the HTTP POST command contains individual configuration parameters (or the like) and/or a list of configuration files to obtain from the server or any other source on the network that is accessible to the gateway. HTTP GET commands may be used to obtain each of the configuration files.

Server 24 receives (66) the XML document from gateway 20 and parses the XML code to obtain the device identification information. Server 24 dynamically generates (67) configuration information for the gateway by selecting from a plurality of configurations based on the data. More specifically, server 24 identifies (67*a*) the device based on the identification information in the XML document, selects (67*b*) configuration information appropriate for the identified device, retrieves the configuration information associated with the device from one or more sources—remote and/or local, and combines (67*c*) the configuration information to create a customized configuration for the gateway to use with the device.

Server 24 may also obtain capabilities of a device, defined, e.g., by SNMP MIBs (Management Information Bytes), from a database in which the capabilities are correlated to the identification information (e.g., a type of the device (e.g., copier) and a version of the device). The database may be stored in a server (either server 24 or a different server), and SNMP MIBs downloaded from there. The configuration information may be generated with knowledge of these capabilities. For example, if one of the capabilities of a device is to print documents, the configuration information may specify that total paper usage in the device is to be monitored.

The configuration information may specify data variables for the gateway to collect from a device, expressions, alarm conditions for the gateway to identify in the device, data from the device for the gateway to log, notifications to alert others to a condition in the device, and processes for reporting this information to a centralized server. The configuration information may also include instructions to process information received from a device, to generate a graphical user interface to display information relating to the device; and to define a language for presenting information relating to the device.

The configuration information may include a list of files for gateway 20 to retrieve from various sources. Server 24 may generate this list from a set of available files. These files may contain device configuration information and may be provided to gateway 20 in response to a request from gateway 20.

Thus, the resulting configuration information may constitute an amalgamation of data associated with the device and retrieved by the server from various sources. This is different from other types of gateway configuration protocols, such as OSGI (Open Services Gateway Initiative), which only specifies a method of downloading bundles that provide predefined services.

As noted above, the configuration information is based on the type of the device and may also be based on the instance of that device or the type/instance of gateway 20. Server 24 may have access to different configuration information for a device type/instance. For example, when configurations are translated into different languages (e.g., French, English, Spanish, etc.), each language version may be stored at server 24 and returned to the gateway based on the gateway's location.

Server 24 may generate (67) the configuration information using a template. That is, server 24 may retrieve (e.g., from memory or a remote location), a template specific to a device type and augment the template dynamically with configuration parameters specific to the device. For example, each customer may choose its own settings that indicate an alarm condition in a device. When generating the configuration information, server 24 may retrieve this customer data from a database and insert it into the appropriate portions of the template.

Server 24 may generate the configuration information based on a hierarchy of the identification information. That is, server 24 may find the best "fit" configuration information for a device by searching first for configuration information that corresponds to an exact instance of the device. If the appropriate configuration information, or a portion thereof, is not found, server 24 may search next for configuration information that corresponds to a model of the device. If the appropriate configuration information, or a portion thereof, is not found, server 24 may search next for more general configuration information, such as configuration information that corresponds to a manufacturer of the device. For example, the search order for configuration information for a copier might be Model X13 at floor 32, then model X13, then multi-function copier, then copier. In this manner, server 24 is able to generate the most appropriate configuration information for a device.

As noted above, a server (not shown) other than server 24 may contain a database of SNMP MIBs that define the capabilities of one or more devices. In response to a request, e.g., from server 24, which identifies the devices connected to gateway 20 (e.g., the request may include the identification information sent from gateway 20), this other server may find the best "fit" capabilities in the manner described above. That is, the other server may search through the SNMP MIBs according to the hierarchy of the identification information (e.g., first search according to device instance for SNMP MIBs that correspond to the device instance and then search more generally until appropriate SNMP MIBs are found) and output the appropriate SNMP MIBs to server 24. Server 24 may then use these SNMP MIBs defining the capabilities of the device to generate its configuration information.

Once server 24 generates the configuration information, server 24 creates (69) an extensible Markup Language (XML) document that contains the configuration information, including, e.g., a list of files for gateway 20 to download. The configuration information may be formatted as an XML document using an XML template. Server 24 transmits (70) the resulting XML document to gateway 20 via a reply to the gateway's initial HTTP POST command.

Gateway 20 receives (71) the XML document, parses the XML document to obtain the configuration information, and obtains (using, e.g., an HTTP GET command) any files in the list (e.g., device drivers) needed to support the configuration defined by the received configuration information. The files may be obtained from memory and/or a remote source, such as server 24. The files may be per-device rules, Web resources, or the like.

Gateway 20 configures (72) itself using the configuration information, including any additional files that gateway 20 retrieves. For example, if the configuration information specifies that gateway 20 should instruct server 24 upon detecting an alarm condition in device 14, gateway 20 reconfigures itself to detect the alarm condition and make the appropriate report to server 24. More specifically, gateway 20 configures itself to obtain the information from the device necessary to detect the alarm condition, to calculate the alarm condition, and to perform the necessary reporting function.

As another example, gateway 20 may configure itself, using the configuration information, to monitor specific parameters of device 14 (e.g., total paper usage or copy count of a photocopier). Assuming that gateway 20 is monitoring similar parameters in devices 15 through 17, gateway 20 may aggregate the monitored information from devices 14 through 17 (or some subset thereof), and report the aggregated data to server 24 or other remote device.

Gateway 20 may also reconfigure one or more of devices 14 to 17 using the new configuration information. For example, gateway 20 may transmit (74) at least some of the configuration information to a device 14. Which configuration information is to be transmitted (e.g., device operational parameters) may be identified in the configuration information itself and/or pre-programmed into gateway 20. The embedded controller 25 in device 14 receives (75) the configuration information and reconfigures (76) the device accordingly.

Thus, another difference between the operation of gateway 20 and OSGI (mentioned above) is that OSGI gateways request bundles and a server fulfills that request. An OSGI Gateway decides which bundles it needs, based on other software modules or a user's actions. Gateway 20 reports its devices to a server so that the server can manage what the gateway will do with those devices. With server 24, it is therefore possible to personalize or customize operations based on customer, location, service group, etc.

Architecture

Process 50 is not limited to use with the hardware/software configuration of FIG. 1; it may find applicability in any computing or processing environment. Each portion of process 50 may be implemented in hardware (e.g., an ASIC {Application-Specific Integrated Circuit} and/or an FPGA {Field Programmable Gate Array}), software, or a combination of hardware and software running on one or more of embedded device 14, gateway 20, and server 24.

Each portion of process 50 may be implemented using one or more computer programs executing on one or more programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer or other machine for configuring and operating the computer when the storage medium or device is read by the computer to perform process 50.

Each portion of process 50 may also be implemented as a machine-readable storage medium, configured with a computer program, where, upon execution, instructions in the computer program cause the computer or other machine to operate in accordance with process 50.

The invention is not limited to use with the protocols and standards described above. For example, Web server 24 may use Java servlets, ASP (Active Server Pages), ISAPI (Internet Server Application Programming Interface), and/or NET interfaces to effect communications. The commands sent by embedded controller 25, server 24, and gateway 20 are not limited to HTTP GET and POST commands. Any commands and/or requests for requesting and receiving data may be used.

The data transferred between embedded controller 25, gateway 20, and server 24 is not limited to the configuration information described above. The configuration information may include, for example, a schedule of actions to be performed by gateway 20, which is based on information pertaining the owner of a device 14. For example, owner preferences may be stored in database 35. The instance-specific data may be used by server 24 to correlate the owner of the device to the appropriate preferences. These preferences then may be transmitted to gateway 20 to control the operation of device 14.

The documents and commands described above are not limited to XML format. Any computer language or other machine-readable format may be used for the commands. The documents may be in any format. In addition, the invention is not limited to use with the Web, Web servers, networks and the like. The servers and embedded controllers described herein may be the same type of general-purpose computer appropriately programmed, or different devices.

Embedded controller 25, gateway 20, and server 24 are depicted as different devices in FIG. 1. However, their functionality may be included on one device, two devices, or more than three devices.

Other embodiments not described herein are also within the scope of the following claims.

What is claimed is:

1. A method performed by a gateway that is in a communication path between a device and a network, comprising:
   obtaining data relating to the device, the data being non-address data that distinguishes the device from other devices to which the gateway communicates;
   transmitting the data to a server on the network;
   receiving configuration information from the server, the configuration information comprising customized information relating to the device that is based on the data; and
   configuring the gateway using the configuration information, wherein the gateway is configured in accordance with the configuration information to alter operation of the gateway and thereby enable the gateway to perform one or more functions that are specific to the device, the one or more functions comprising an action that the gateway performs on the device to obtain information from the device and to report that information to a third party over the network;
   wherein the gateway stores configurations for other devices to which the gateway communicates, the configurations comprising actions that the gateway performs on the other devices, the actions that the gateway performs on the other devices being independent of, and different from, the action that the gateway performs on the device.

2. The method of claim 1, wherein the data comprises identification information for the device.

3. The method of claim 2, wherein the identification information identifies at least one of a type of the device, an instance of the device, a version of the device, and a manufacturer of the device.

4. The method of claim 1, wherein the data is obtained by communicating with the device using a discovery protocol.

5. The method of claim 1, wherein the data is obtained by reading a file.

6. The method of claim 5, wherein the file resides on the gateway.

7. The method of claim 1, wherein the data is transmitted to the server as an eXtensible Markup Language (XML) document using HyperText Transfer Protocol (HTTP).

8. The method of claim 1, further comprising:
   formatting the data as a self-describing computer language document prior to transmitting.

9. The method of claim 1, further comprising:
   transmitting at least some of the configuration information to the device.

10. The method of claim 1, wherein the configuration information is generated dynamically based on the data.

11. The method of claim 1, wherein the configuration information comprises at least one of (i) instructions to process, collect and/or publish information received from the device, (ii) instructions to generate a graphical user interface to display information relating to the device; (iii) instructions defining a language for presenting information relating to the device, and (iv) a list of files to download.

12. The method of claim 1, wherein the configuration information comprises a list of files to download; and
   the method further comprises downloading at least one of the files from the list.

13. The method of claim 1, further comprising:
   determining if communication with the device has been lost; and
   reporting a loss of communication to the server.

14. The method of claim 1, further comprising:
   determining if predetermined configuration information can be obtained from the device; and
   receiving the predetermined configuration information from the device, wherein obtaining, transmitting, receiving, and configuring are performed if the predetermined configuration information cannot be received from the device.

15. The method of claim 1, further comprising:
   aggregating data from plural monitored devices; and
   reporting the aggregated data to the server.

16. A storage medium that stores instructions that are executable by a gateway that is in a communication path between a device and a network, the instructions causing the gateway to:
   obtain data relating to the device, the data being non-address data that distinguishes the device from other devices to which the gateway communicates;
   transmit the data to a server on the network;
   receive configuration information from the server, the configuration information comprising customized information relating to the device that is based on the data; and
   configure the gateway using the configuration information, wherein the gateway is configured in accordance with the configuration information to alter operation of the gateway and thereby enable the gateway to perform one or more functions that are specific to the device, the one or more functions comprising an action that the gateway performs on the device to obtain information from the device and to report that information to a third party over the network;

wherein the gateway stores configurations for other devices to which the gateway communicates, the configurations comprising actions that the gateway performs on the other devices, the actions that the gateway performs on the other devices being independent of, and different from, the action that the gateway performs on the device.

17. The storage medium of claim 16, wherein the data comprises identification information for the device.

18. The storage medium of claim 17, wherein the identification information identifies at least one of a type of the device, an instance of the device, a version of the device, and a manufacturer of the device.

19. The storage medium of claim 16, wherein the data is obtained by communicating with the device using a discovery protocol.

20. The storage medium of claim 16, wherein the data is obtained by reading a file.

21. The storage medium of claim 20, wherein the file resides on the gateway.

22. The storage medium of claim 16, wherein the data is transmitted to the server as an eXtensible Markup Language (XML) document using HyperText Transfer Protocol (HTTP).

23. The storage medium of claim 16, further comprising instructions that cause the gateway to:
format the data as a self-describing computer language document prior to transmitting.

24. The storage medium of claim 16, further comprising instructions that cause the gateway to:
transmit at least some of the configuration information to the device.

25. The storage medium of claim 16, wherein the configuration information is generated dynamically based on the data.

26. The storage medium of claim 16, wherein the configuration information comprises at least one of (i) instructions to process, collect and/or publish information received from the device, (ii) instructions to generate a graphical user interface to display information relating to the device; (iii) instructions defining a language for presenting information relating to the device, and (iv) a list of files to download.

27. The storage medium of claim 16, wherein the configuration information comprises a list of files to download; and
the storage medium further comprises instructions to download at least one of the files from the list.

28. The storage medium of claim 16, further comprising instructions that cause the gateway to:
determine if communication with the device has been lost; and
report a loss of communication to the server.

29. The storage medium of claim 16, further comprising instructions that cause the gateway to:
determine if predetermined configuration information can be obtained from the device; and
receive the predetermined configuration information from the device, wherein obtaining, transmitting, receiving, and configuring are performed if the predetermined configuration information cannot be received from the device.

30. The storage medium of claim 16, further comprising instructions that cause the gateway to:
aggregate data from plural monitored devices; and
report the aggregated data to the server.

31. A gateway that is in a communication path between a device and a network, the gateway comprising one or more processing devices to:
obtain data relating to the device, the data being non-address data that distinguishes the device from other devices to which the gateway communicates;
transmit the data to a server over the network; and
receive configuration information from the server, the configuration information comprising customized information relating to the device that is based on the data; and
configure the gateway using the configuration information, wherein the gateway is configured in accordance with the configuration information to alter operation of the gateway and thereby enable the gateway to perform one or more functions that are specific to the device, the one or more functions comprising an action that the gateway performs on the device to obtain information from the device and to report that information to a third party over the network;
wherein the gateway stores configurations for other devices to which the gateway communicates, the configurations comprising actions that the gateway performs on the other devices, the actions that the gateway performs on the other devices being independent of, and different from, the action that the gateway performs on the device.

32. The gateway of claim 31, wherein the data comprises identification information for the device.

33. The gateway of claim 32, wherein the identification information identifies at least one of a type of the device, an instance of the device, a version of the device, and a manufacturer of the device.

34. The gateway of claim 31, wherein the data is obtained by communicating with the device using a discovery protocol.

35. The gateway of claim 31, wherein the data is obtained by reading a file.

36. The gateway of claim 35, wherein the file resides on the gateway.

37. The gateway of claim 31, wherein the data is transmitted to the server as an eXtensible Markup Language (XML) document using HyperText Transfer Protocol (HTTP).

38. The gateway of claim 31, wherein the one or more processing devices are configured to:
format the data as a self-describing computer language document prior to transmitting.

39. The gateway of claim 31, wherein the one or more processing devices are configured to:
transmit at least some of the configuration information to the device.

40. The gateway of claim 31, wherein the configuration information is generated dynamically based on the data.

41. The gateway of claim 31, wherein the configuration information comprises at least one of (i) instructions to process, collect and/or publish information received from the device, (ii) instructions to generate a graphical user interface to display information relating to the device; (iii) instructions defining a language for presenting information relating to the device, and (iv) a list of files to download.

42. The gateway of claim 31, wherein the configuration information comprises a list of files to download; and
wherein the one or more processing devices are configured to download at least one of the files from the list.

43. The gateway of claim 31, wherein the one or more processing devices are configured to:
   determine if communication with the device has been lost; and
   report a loss of communication to the server.

44. The gateway of claim 31, wherein the one or more processing devices are configured to:
   determine if predetermined configuration information can be obtained from the device; and
   receive the predetermined configuration information from the device, wherein obtaining, transmitting, receiving, and configuring are performed if the predetermined configuration information cannot be received from the device.

45. The gateway of claim 31, wherein the one or more processing devices are configured to:
   aggregate data from plural monitored devices; and
   report the aggregated data to the server.

46. The gateway of claim 31, wherein the one or more processing devices comprise at least one of programmable logic, logic gates, a processor, and a memory.

47. A system comprising:
   a device;
   a gateway that is in communication with the device; and
   a server that is in communication with the gateway;
   wherein the gateway comprises circuitry to:
      obtain data relating to the device, the data being non-address data that
   distinguishes the device from other devices to which the gateway communicates
      transmit the data to the server,
      receive configuration information from the server that is generated based on the data, and
      configure the gateway using the configuration information, wherein the gateway is configured in accordance with the configuration information to alter operation of the gateway and thereby enable the gateway to perform one or more functions that are specific to the device, the one or more functions comprising an action that the gateway performs on the device to obtain information from the device and to report that information to a third party over the network;
   wherein the gateway stores configurations for other devices to which the gateway communicates, the configurations comprising actions that the gateway performs on the other devices, the actions that the gateway performs on the other devices being independent of, and different from, the action that the gateway performs on the device; and
   wherein the server comprises circuitry to receive the data from the gateway, to generate the configuration information based on the data, and to transmit the configuration information to the gateway.

48. The system of claim 47, further comprising:
   an apparatus comprising circuitry to:
      receive identification information for the device from the server;
      search a database of Simple Network Management Protocol Management Information Bytes (SNMP MIBs) based on the identification information to obtain SNMP MIBs that correspond to the device, the SNMP MIBs defining one or more capabilities of the device; and
      output, to the server, SNMP MIBs that correspond to the device.

49. The system of claim 47, wherein the circuitry for the gateway comprises at least one of programmable logic, logic gates, a processor, and a memory.

* * * * *